United States Patent [19]

Ohiwa et al.

[11] Patent Number: 5,478,381
[45] Date of Patent: Dec. 26, 1995

[54] INK COMPOSITION

[75] Inventors: Tsunemi Ohiwa, Osaka; Yoshinori Yamamoto, Takatsuki, both of Japan

[73] Assignee: Hitachi Maxell, Ltd., Osaka, Japan

[21] Appl. No.: 318,118

[22] Filed: Oct. 5, 1994

[30] Foreign Application Priority Data

Oct. 5, 1993 [JP] Japan ................................. 5-274938

[51] Int. Cl.$^6$ ................................................ C09D 11/02
[52] U.S. Cl. ................................... 106/21 A; 106/21 R
[58] Field of Search ............................... 106/21 R, 21 A

[56] References Cited

U.S. PATENT DOCUMENTS 5,271,764  12/1993  Winnik et al. ..................... 106/21 A
5,286,286  2/1994  Winnik et al. ..................... 106/21 A

FOREIGN PATENT DOCUMENTS

| | | |
|---|---|---|
| 53-9607 | 1/1978 | Japan . |
| 53-9600 | 1/1978 | Japan . |
| 54-22326 | 8/1979 | Japan . |
| 61-18231 | 5/1986 | Japan . |

*Primary Examiner*—Helene Klemanski
*Attorney, Agent, or Firm*—Birch, Stewart, Kolasch & Birch

[57] ABSTRACT

An ink composition containing an infrared ray-emitting fluorescent substance, at least one dispersant selected from the group consisting of alkylamines and phosphate salts, and a binder resin, which is excellent in light-emitting characteristics.

20 Claims, No Drawings

INK COMPOSITION

BACKGROUND OF THE INVENTION

1. Field of the Invention

The present invention relates to an ink composition comprising an infrared ray-emitting fluorescent substance which is excited by infrared ray and emits light in the infrared region, and printed material which is printed using said ink composition. In particular, the present invention relates to an ink composition in which an infrared ray-emitting fluorescent substance is well dispersed having excellent light-emitting characteristics, and the printed material on which the infrared ray-emitting layer with excellent light-emitting characteristics is printed using the ink composition.

2. Description of the Related Art

To prevent forgery and maintain secrecy, an infrared ray-emitting layer which cannot be visible to the naked eye such as a stealth bar code is printed on a printed material such as a brochure or catalogue using an ink composition comprising an infrared ray emitting fluorescent substance which emits light in the infrared region, and the code information is read by an apparatus for optically reading information of goods such as properties and a price or various personal information (see Japanese Patent Publication No. 18231/1986 and Japanese Patent KOKAI Publication No. 9600/1978). It has been attempted to print an infrared ray-emitting layer on a plastic substrate, such as a prepaid card, an ID card and a magnetic card, or a magnetic layer using such ink ribbon.

As an infrared ray-emitting fluorescent substance to be used in a conventional ink composition which is printed to form an infrared ray-emitting layer, for example, a phosphoric acid base infrared ray-emitting fluorescent substance of the formula:ps $$QD_{1-x-y}Nd_xYb_yP_4O_{12}$$

wherein Q is at least one element selected from the group consisting of Li, Na, K, Rb and Cs; D is at least one element selected from the group consisting of Sc, Y, La, Ce, Gd, Lu, Ga and In; x is a number of 0.05 to 0.999 and y is a number of 0.001 to 0.95, provided that a sum of x and y (x+y) is 1.0 or less is disclosed in Japanese Patent Publication No. 22326/1979 and widely used.

However, the conventionally used infrared ray-emitting fluorescent substance has poor dispersibility and may not provide an ink composition having a sufficient emitted light intensity. In particular, since the phosphoric acid base infrared ray-emitting fluorescent substance of the above general formula has a large particle size of at least 7 μm, it should be ground to a smaller particle size when a UV curable resin is used as a binder resin, or when the ink composition comprising the fluorescent substance is printed by off-set printing or by ink jet printer. But, by grinding, crystallinity or composition of the infrared ray-emitting fluorescent substance is deteriorated, its dispersibility is greatly deteriorated, an intensity of emitted light is greatly decreased and duration of afterglow is shortened.

To improve the dispersibility of the conventional infrared ray-emitting fluorescent substance in the ink composition, there is used a surfactant, such as alpha-olefinsulfonic acid salts, alkylbenzenesulfonic acid salts and alkylphenols, as a dispersant. But the dispersibility is not sufficiently improved by such a dispersant.

SUMMARY OF THE INVENTION

One object of the present invention therefore, is to provide an ink composition comprising an infrared ray-emitting fluorescent substance, which exhibits improved dispersibility of the fluorescent substance and can be used when a UV curable resin is used as a binder resin, or when it is printed by offset printing or by ink jet printer.

Another object of the present invention is to provide a printed material having an infrared ray-emitting layer which is formed from an ink composition excellent in light-emitting characteristics.

According to a first aspect of the present invention, there is provided an ink composition comprising an infrared ray-emitting fluorescent substance, at least one dispersant selected from the group consisting of alkylamines and phosphate salts, and a binder resin.

According to a second aspect of the present invention, there is provided a printed material comprising a base material and an infrared ray-emitting layer printed on the base material from the ink composition of the present invention.

In a preferred embodiment, the ink composition contains, as an infrared ray-emitting fluorescent substance having a high intensity of light emission and long duration of afterglow, an infrared ray-emitting fluorescent substance of the formula:

$$A_{1-x-y}Nd_xYb_yPO_4 \quad (I)$$

wherein A is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 and not larger than 1, or the formula:

$$A_{2-p-q}Nd_pYb_qCa_5(MoO_4)_8 \quad (II)$$

wherein A is the same as defined above, p is a number of 0 to 2, and 8 is a number of 0 to 2, provided that a sum of p and q is larger than 0 and not larger than 2.

DETAILED DESCRIPTION OF THE INVENTION

The ink composition of the present invention comprises, as a dispersant, an alkylamine or a phosphate salt. The dispersant adheres to the particle surfaces of the infrared ray-emitting fluorescent substance and improves its affinity to a binder resin to disperse the fluorescent substance well in the binder resin.

As the alkylamine, one having from 12 to 18 carbon atoms is preferably used. As the phosphate salt, methacryloyl phosphate is preferably used.

An alkyl group of the alkylamine may be a straight or branched group. The alkyl group may have an unsaturated group or an aromatic group. Specific examples of the alkylamine are dodecylamine, stearylamine, myristylamine, and so forth. Among them, dodecylamine is preferred in view of its dispersibility effect.

Specific examples of the phosphate salt are mono(2-acryloyloxyethyl) acid phosphate, mono(2-methacryloyloxyethyl) acid phosphate, diphenyl-2-methacryloyloxyethyl phosphate, and so forth. Among them, the methacryloyl phosphates are preferred in view of the dispersibility effect.

The alkylamine and the phosphate salt may be used independently or in combination thereof. An amount of the dispersant is from 0.1 to 5% by weight based on the weight of the infrared ray-emitting fluorescent substance, since the dispersibility of the fluorescent substance is not sufficiently improved when this amount is less than 0.1% by weight, while the fluorescent substance is reagglomerated or powder drops when this amount exceeds 5% by weight.

As the binder resin, any suitable conventionally used resins may be used. Also as the infrared ray-emitting fluorescent substance, any of the conventionally used ones may be used.

When a water-soluble resin is used as the binder resin, an infrared ray-emitting fluorescent substance having a particle size of 7 µm or larger can be used.

When a UV curable resin is used as the binder resin, or when the ink composition comprising the water-soluble resin as the binder resin is printed by an ink jet printer, or when the ink composition comprising a binder resin other than the water soluble resin is printed by offset printing, an infrared ray-emitting fluorescent substance having a small particle size and the high light-emitting intensity is preferably used.

Preferred examples of such infrared ray-emitting fluorescent substance are a phosphoric acid base infrared ray-emitting fluorescent substance of the formula:

$$A_{1-x-y}Nd_xYb_yPO_4 \qquad (I)$$

wherein A is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 and not larger than 1, and a molybdic acid base infrared ray-emitting fluorescent substance of the formula:

$$A_{2-p-q}Nd_pYb_qCa_5(MoO_4)_8 \qquad (II)$$

wherein A is the same as defined above, p is a number of 0 to 2, and 8 is a number of 0 to 2, provided that a sum of p and q is larger than 0 and not larger than 2.

Among the above phosphoric acid base infrared ray-emitting fluorescent substance (I), a tetraphosphoric acid base fluorescent substance may be prepared by mixing a tetraphosphate salt such as ammonium hydrogenphosphate with a raw material powder containing a compound of at least one element selected from the group consisting of Nd and Yb and optionally a compound of at least one element selected from the group consisting of Li, Na, K, Rb and Cs and also optionally a compound of at least one element selected from the group consisting of Sc, Y, La, Ce, Gd, Lu, Ga and In, sintering the mixture, quenching the mixture, and hydrothermally treating it at a temperature of 50° C. or higher to remove impurities such as excessive phosphate salts. This method can produce the infrared ray-emitting fluorescent substance having a particle size of 7 µm or less, in particular the fluorescent substance having a particle size of less than 1 µm and a very high light emitting intensity, which can be contained in the ink composition without grinding.

Among the above phosphoric acid base infrared ray-emitting fluorescent substance (I), an orthophosphoric acid base fluorescent substance may be prepared by mixing orthophosphoric acid or a phosphate salt of the formula:

$$M_{3-z}H_zPO_4 \qquad (III)$$

wherein M is at least one metal element selected from the group consisting of alkali metals and alkaline earth metals and z is a number of 0 to less than 3 with a raw material powder containing a compound of at least one element selected from the group consisting of Nd and Yb and optionally a compound of at least one element selected from the group consisting of Al, Bi, B, In, Ga, Sc, Gd, Ce, Y, Lu and La, sintering the mixture, air cooling the mixture, and hydrothermally treating it at a temperature of 50° C. or higher to remove impurities such as excessive phosphate salts. This method can produce the infrared ray emitting fluorescent substance having a particle size of 7 µm or less, in particular the fluorescent substance having a particle size of less than 1 µm and a very high light emitting intensity, which can be contained in the ink composition without grinding.

The molybdic acid base infrared ray-emitting fluorescent substance (II) may be prepared by mixing molybdenum oxide and calcium carbonate with a raw material powder containing a compound of at least one element selected from the group consisting of Nd and Yb and optionally a compound of at least one element selected from the group consisting of Al, Bi, B, In, Ga, Sc, Gd, Ce, Y, Lu and La, sintering the mixture, air cooling the mixture, and hydrothermally treating it at a temperature of 50° C. or higher to remove impurities such as excessive molybdenum oxide and so on. As in the case of the phosphoric acid base infrared ray-emitting fluorescent substance, this method can produce the infrared ray-emitting fluorescent substance having a particle size of 7 µm or less, in particular the fluorescent substance having a particle size of less than 1 µm and a very high light emitting intensity, which can be contained in the ink composition without grinding.

The above phosphoric acid or molybdic acid base infrared ray-emitting fluorescent substance is preferably used in the ink composition position, when the UV resin as the binder resin, the ink composition comprising the water-soluble resin is used as the binder resin is printed by the jet ink printer and when the ink composition comprising the binder resin other than the water-soluble resin is printed by the offset printing. When such fluorescent substance is used in combination with the dispersant, the dispersibility of the fluorescent substance is improved, and the ink composition has the high light emitting intensity.

The above phosphoric acid or molybdic acid base infrared ray-emitting fluorescent substance emits infrared ray through the forbidden transition of the 4f electrons of Nd and/or Yb. The reason why the light emitting intensity is high though the particle size is small may be that the crystallinity of the tetraphosphate or orthophosphate salt or molybdate salt as a base material is high and further the substance can contain a large amount of Nd and/or Yb. In addition, the crystallinity is improved further by the addition of the alkali metal or alkaline earth metal, whereby the light-emitting intensity is increased.

The tetraphosphate salt, the orthophosphate salt or the phosphate salt (III) may be used independently or in combination thereof. To achieve the high light emitting intensity, the phosphate salt (III) wherein x is large is preferably used.

Molybdenum oxide is preferably used as one of the raw materials of the molybdic acid base infrared ray-emitting fluorescent substance.

As the compounds of Nd and/or Yb, their oxides, chlorides, carbonates, nitrates and acetates are preferably used. As the compounds pounds of Al, Bi, B, In, Ga, Sc, Gd, Ce, Y, Lu and La, their oxides, chlorides, carbonates, nitrates and acetates are preferably used.

The sintering is carried out by charging the raw materials and compounds in a crucible and heating them at a temperature of 400° to 1500° C., preferably 500° to 1000° C. in an air for from 0.5 to 6 hours.

As the binder resin to be contained in the ink composition, the water-soluble resin, such as polyvinyl alcohol, polyvinylpyrrolidone, carboxymethylcellulose, starch, polysodium acrylate, polysodium methacrylate, and the like may be used. With the water-soluble resin, water is used as the solvent.

When the water-soluble resin is used as the binder resin, the infrared ray-emitting fluorescent substance having a particle size of 0.1 to 20 µm is preferably used. An amount of the infrared ray-emitting fluorescent substance is preferably from 30 to 90% by weight, more preferably from 60 to 80% by weight based on the weight of the water-soluble resin.

In particular, when the ink composition comprising the water-soluble resin is printed by the ink jet printer, the acrylic polymer, polyvinyl alcohol, polyvinylpyrrolidone, aliphatic acid acrylate, glycerol, polyethylene glycol and the like is preferably used. Examples of the commercially available polyethylene glycol are Polyethylene glycol #400, Polyethylene glycol #300 and Polyethylene glycol #600 (all available from Nacalai Tesque, Inc.). Examples of the commercially available polyvinyl alcohol are PVA 203, PVA 205, PVA 207, PVA 105 and PVA 110 (all available from KURARAY Co., Ltd.), and PA-0510 and MA-5 (both available from Shin-etsu Chemical Co., Ltd.).

In the above case, as the solvent, water, ethanol, methyl ethyl ketone and their mixture are used. In addition, an electrical conductivity adjusting agent such as $LiNO_3$, LiCl, $KNO_3$, etc. may be added to the ink composition.

When the ink composition is printed by the ink jet printer, the infrared ray-emitting fluorescent substance having the particle size of 0.1 to 2 µm, preferably 0.3 to 1 µm is used. A weight ratio of the binder resin to the fluorescent substance is from 0.3:1 to 2:1, preferably 0.5:1 to 1:1. The content of the infrared ray-emitting fluorescent substance is from 3 to 20% by weight, preferably from 5 to 10% by weight based on the weight of the whole ink composition.

As the UV curable resin, there are used polyfunctional acryloyl group pendant type UV curable resins such as polyepoxy acrylate, polyester acrylate, polyether acrylate, polyurethane acrylate, polyacryl alkylate, alkyd acrylate resin and the like.

The UV curable resin is used together with an photopolymerization initiator and/or a UV light absorber. A viscosity of the ink composition can be adjusted by the addition of a hardener to control coating and printing conditions of the ink composition.

When the UV curable resin is used, the infrared ray-emitting fluorescent substance having a particle size of 0.1 to 1 µm is preferably used. An amount of the fluorescent substance is preferably from 10 to 45% by weight, more preferably from 25 to 35% by weight based on the weight of the UV curable resin.

In particular, when the ink composition comprising the infrared ray-emitting fluorescent substance having the particle size of 0.1 to 1 µm is printed on a porous substrate such as a sheet of paper, the fine particles of the fluorescence substance are absorbed in the pores of the substrate so that the effects of the fluorescent substance may not be achieved completely. To prevent such a problem, the UV curable resin is quickly cured to suppress or prevent the absorption of the fine particles of the fluorescent substance in the pores of the porous substrate. Accordingly, the infrared ray-emitting fluorescent substance having the small particle size is preferably used in combination with the UV curable resin.

Examples of the binder resin other than the water-soluble resin and the UV curable resin are polyurethane resin, polyester resins, acrylic resins, polycarbonate resins, polyvinyl butyral resins, polystyrene resins, acryl silicone resins, alkyd resins, ethylene-vinyl acetate copolymers, ethyl acrylate resins, epoxy resins, phenoxy resins, and their modified resins. They may be used independently or as a mixture thereof.

When the above binder resin is used, the infrared ray-emitting fluorescent substance having a particle size of from 0.1 to 10 µm is used. An amount of the fluorescent substance is from 30 to 90% by weight, preferably from 60 to 85% by weight based on the binder resin.

As a solvent in which the above binder resin is dissolved, a solvent having a medium or high boiling point of, for example 100 to 250° C., is preferably used. For example, a mixture of a high boiling solvent (e.g. ethylene glycol monobutyl ether, cyclohexanone, etc.) and a medium boiling solvent (e.g. xylene, butyl acetate, cellosolve acetate, etc.) is preferably used.

The ink composition of the present invention may be produced by any of conventional method. For example, at least one dispersant selected from the alkylamines and the phosphate salts may be mixed and dispersed together with the infrared ray-emitting fluorescent substance, the binder resin, the solvent and other optional component(s).

The ink composition is coated on a conventionally used substrate such as a sheet of paper, a plastic film (e.g. a polyethylene terephthalate film) and a magnetic layer by a conventional printing method such as screen printing, offset printing, gravure printing, relief printing, intaglio printing, and the like and dried to produce a printed matter such as a catalogue, a prepaid card, an ID card, a magnetic card and the like on which the infrared ray-emitting layer invisible to the naked eyes, such as a stealth bar cord, is printed A thickness of the printed infrared ray-emitting layer depends on the kind of the printing method to be employed.

In the case of screen printing, the thickness of the ink layer is preferably from 1 to 20 µm, more preferably from 2 to 8 µm. In the case of offset printing, gravure printing or relief printing, the thickness of the ink layer is preferably from 0.2 to 4 µm, more preferably from 0.5 to 2 µm. In the case of intaglio printing, the thickness of the ink layer is preferably from 0.2 to 10 µm, more preferably from 0.5 to 5 µm.

The ink composition of the present invention may contain a pigment or dye except carbon black which absorbs the infrared ray, such as Lake Red C (a red organic pigment), phthalocyanine blue (a blue organic pigment), etc.

PREFERRED EMBODIMENTS OF THE INVENTION

The present invention will be illustrated by the following examples, in which "parts" are by weight unless otherwise indicated.

EXAMPLE 1

The following components were well mixed and charged in an aluminum crucible having a lid:

| Component | Parts |
| --- | --- |
| Lithium dihydrogenphosphate ($LiH_2PO_4$) | 260.0 |
| Neodymium oxide ($Nd_2O_3$) | 9.4 |

-continued

| Component | Parts |
| --- | --- |
| Ytterbium oxide ($Yb_2O_3$) | 10.9 |
| Yttrium oxide ($Y_2O_3$) | 50.2 |

The crucible was heated from room temperature to 750° C. at a constant heating rate over 2 hours and sintered at 750° C. for 2 hours in an electric furnace.

After sintering, the crucible was removed from the electric furnace and cooled in an air. Then, hot water of 100° C. was poured in the crucible and boiled. Thereafter, a formed substance was recovered from the crucible and washed with 1N nitric acid and then with water, followed by drying to obtain an infrared ray-emitting fluorescent substance, which had a particle size of 0.5 μm and a composition of $Nd_{0.1}Yb_{0.1}Y_{0.8}PO_4$.

The obtained infrared ray-emitting fluorescent substance (48.4 parts), a vinyl chloride-vinyl acetate-vinyl alcohol copolymer (VAGH manufactured by UCC, USA) (11.0 parts), cyclohexanone (38.5 parts), butyl cellosolve (4.4 parts) and dodecylamine (1.0 part) were mixed and dispersed in a sand mill for 1 hour. To the mixture, a trifunctional low molecular weight isocyanate compound (Colonate L manufactured by Nippon Polyurethane Industries, Ltd.) (1.1 parts) was added and mixed for 0.5 hour to obtain an ink composition.

The ink composition was coated on a sheet of paper by screen printing and dried to form an infrared ray-emitting layer having a thickness of 5 μm.

EXAMPLE 2

The infrared ray-emitting fluorescent substance prepared in Example 1 was mixed with the following components on a three-roll kneader for 1 hour to prepare an ink composition:

| Component | Parts |
| --- | --- |
| Infrared ray-emitting fluorescent substance ($Nd_{0.1}Yb_{0.1}Y_{0.8}PO_4$, particle size: 0.5 μm) | 37.5 |
| Pentafunctional aliphatic acrylate UV curable resin (Nopcomer 4510 manufactured by Sunnopco) | 18.0 |
| Trifunctional aliphatic acrylate UV curable resin (Photomer 4149 SN manufactured by Henkel) | 10.6 |
| Polyurethane base trifunctional acrylate UV curable resin (Photomer 6008 manufactured by Henkel) | 44.4 |
| Photopolymerization initiator (Irgacure 907 manufactured by Ciba-Geigy) | 2.1 |
| Photopolymerization initiator (Dalocure 1173 manufactured by EM Chemical) | 3.1 |
| Dodecylamine | 0.5 |
| Diphenyl-2-methacryloyloxyethyl phosphate | 0.5 |

The ink composition was printed on a sheet of paper by offset printing to form an infrared ray-emitting layer having a thickness of 1.0 μm.

EXAMPLE 3

In the same manner as in the preparation of the infrared ray-emitting fluorescent substance in Example 1 except that neodymium oxide was not used, an infrared ray-emitting fluorescent substance was prepared. The obtained infrared ray-emitting fluorescent substance had a particle size of 0.6 μm and a composition of $Yb_{0.11}Y_{0.89}PO_4$.

In the same manner as in the production of the ink composition in Example 1 except that the above prepared infrared ray-emitting fluorescent substance ($Yb_{0.11}Y_{0.89}PO_4$) was used, an ink composition was produced.

The ink composition was printed on a sheet of paper by screen printing to form an infrared ray-emitting layer having a thickness of 5 μm.

EXAMPLE 4

In the same manner as in the preparation of the infrared ray-emitting fluorescent substance in Example 1 except that yttrium oxide was not used, an infrared ray-emitting fluorescent substance was prepared. The obtained infrared ray-emitting fluorescent substance had a particle size of 0.6 μm and a composition of $Nd_{0.5}Yb_{0.5}PO_4$.

In the same manner as in the production of the ink composition in Example 1 except that the above prepared infrared ray-emitting fluorescent substance ($Nd_{0.5}Yb_{0.5}PO_4$) was used, an ink composition was produced.

The ink composition was printed on a sheet of paper by screen printing to form an infrared ray-emitting layer having a thickness of 5 μm.

EXAMPLE 5

In the same manner as in the production of the ink composition in Example 2 except that the infrared ray-emitting fluorescent substance ($Yb_{0.11}Nd_{0.89}PO_4$ prepared in Example 3 was used, an ink composition was produced.

The ink composition was printed on a sheet of paper by offset printing to form an infrared ray-emitting layer having a thickness of 1.0 μm.

EXAMPLE 6

In the same manner as in the production of the ink composition in Example 2 except that the infrared ray-emitting fluorescent substance ($Nd_{0.5}Yb_{0.5}PO_4$) prepared in Example 4 was used, an ink composition was produced.

The ink composition was printed on a sheet of paper by offset printing to form an infrared ray-emitting layer having a thickness of 1.0 μm.

EXAMPLE 7

The following components were well mixed and charged in an aluminum crucible having a lid:

| Component | Parts |
| --- | --- |
| Ammonium dihydrogenphosphate [$(NH_4)H_2PO_4$] | 162.0 |
| Lithium carbonate ($LiCO_3$) | 39.6 |
| Neodymium oxide ($Nd_2O_3$) | 13.0 |

The crucible was heated from room temperature to 650° C. at a constant heating rate over 2 hours and sintered at 650° C. for 0.5 hour in an electric furnace.

After sintering, the crucible was removed from the electric furnace and cooled in an air. Then, hot water of 100° C. was poured in the crucible and boiled. Thereafter, a formed substance was recovered from the crucible and washed with 1N nitric acid and then with water, followed by drying to obtain an infrared ray-emitting fluorescent substance, which had a particle size of 2.0 μm and a composition of $LiNdP_4O_{12}$.

The obtained infrared ray-emitting fluorescent substance (42.1 parts), a vinyl alcohol resin (KURARAY PVA 205 manufactured by KURARAY) (10.5 parts), water (52.7 parts) and dodecylamine (0.5 part) were mixed and dispersed in a sand mill for 96 hours to obtain an ink composition.

The ink composition was coated on a sheet of paper by screen printing and dried to form an ink layer having a thickness of 5 μm.

EXAMPLE 8

The infrared ray-emitting fluorescent substance prepared in Example 1 ($Nd_{0.1}Yb_{0.1}Y_{0.8}PO_4$; particle size of 0.5 μm) (10.0 parts), a polyethylene glycol (Polyethylene glycol manufactured by Nacalai Tesque, Inc.) (12.0 parts), water (65.0 parts) and dodecylamine (0.5 part) were mixed and dispersed in a sand mill for 1 hour to obtain an ink composition.

The ink composition was coated on a sheet of paper by an ink jet printer.

EXAMPLE 9

In the same manner as in Example 8 except that polyvinyl alcohol (PVA 203 manufactured by KURARAY) was used in place of polyethylene glycol, an ink composition was prepared and printed on a sheet of paper by the ink jet printer.

EXAMPLE 10

The following components were well mixed and charged in an aluminum crucible having a lid:

| Component | Parts |
| --- | --- |
| Ammonium dihydrogenphosphate [$(NH_4)H_2PO_4$] | 75.7 |
| Neodymium oxide ($Nd_2O_3$) | 16.2 |
| Ytterbium oxide ($Yb_2O_3$) | 2.2 |
| Lithium carbonate ($Li_2CO_3$) | 5.9 |

The crucible was heated from room temperature to 650° C. at a constant heating rate over 2 hours and sintered at 650° C. for 1 hour in an electric furnace.

After sintering, the crucible was removed from the electric furnace and cooled in an air. Then, hot water of 100° C. was poured in the crucible and boiled. Thereafter, a formed substance was recovered from the crucible and washed with 1N nitric acid and then with water, followed by drying to obtain an infrared ray-emitting fluorescent substance, which had a particle size of 2.0 μm and a composition of $LiNd_{0.9}Yb_{0.1}P_4O_{12}$.

In the same manner as in the production of the ink composition in Example 7 except that the above prepared infrared ray-emitting fluorescent substance ($LiNd_{0.9}Yb_{0.1}P_4O_{12}$) was used, an ink composition was produced.

The ink composition was printed on a sheet of paper by screen printing to form an infrared ray-emitting layer having a thickness of 5 μm.

EXAMPLE 11

In the same manner as in the production of the ink composition in Example 1 except that the amount of dodecylamine was changed from 1.0 parts to 0.05 parts, an ink composition was prepared and printed on a sheet of paper by screen printing to form an infrared ray-emitting layer having a thickness of 5 μm.

EXAMPLE 12

In the same manner as in the production of the ink composition in Example 1 except that the amount of dodecylamine was changed from 1.0 parts to 2.4 parts, an ink composition was prepared and printed on a sheet of paper by screen printing to form an infrared ray-emitting layer having a thickness of 5 μm.

EXAMPLE 13

In the same manner as in the production of the ink composition in Example 2 except that dodecylamine was not used, an ink composition was prepared and printed on a sheet of paper by offset printing to form an infrared ray-emitting layer having a thickness of 1 μm.

EXAMPLE 14

In the same manner as in the production of the ink composition in Example 1 except that stearylamine was used in place of dodecylamine, an ink composition was prepared and printed on a sheet of paper by screen printing to form an infrared ray-emitting layer having a thickness of 5 μm.

EXAMPLE 15

In the same manner as in the production of the ink composition in Example 14 except that mono(2-acryloyloxyethyl) acid phosphate was used in place of diphenyl-2-methacryloyloxyethyl phosphate, ink composition was prepared and printed on a sheet of paper by offset printing to form an infrared ray-emitting layer having a thickness of 1 μm.

EXAMPLE 16

The following components were well mixed and charged in an aluminum crucible having a lid:

| Component | Parts |
| --- | --- |
| Molybdenum oxide ($MoO_3$) | 384.0 |
| Neodymium oxide ($Nd_2O_3$) | 101.0 |
| Ytterbium oxide ($Yb_2O_3$) | 13.1 |
| Calcium carbonate ($CaCO_3$) | 166.7 |

The crucible was heated from room temperature to 750° C. at a constant heating rate over 2 hours and sintered at 750° C. for 2 hours in an electric furnace.

After sintering, the crucible was removed from the electric furnace and cooled in an air. Then, hot water of 100° C. was poured in the crucible and boiled. Thereafter, a formed substance was recovered from the crucible and washed with water, followed by drying to obtain an infrared ray-emitting fluorescent substance, which had a particle size of 0.6 μm and a composition of $Nd_{1.8}Yb_{0.2}Ca_5(MoO_4)_8$.

In the same manner as in the production of the ink composition in Example 1 except that the above prepared infrared ray-emitting fluorescent substance ($Nd_{1.8}Yb_{0.2}Ca_5(MoO_4)_8$) was used, an ink composition was produced and printed on a sheet of paper by screen printing to form an infrared ray-emitting layer having a thickness of 5 μm.

EXAMPLE 17

In the same manner as in the production of the ink composition in Example 2 except that the infrared ray-emitting fluorescent substance prepared in Example 16 ($Nd_{1.8}Yb_{0.2}Ca_5(MoO_4)_8$) was used, an ink composition was prepared and printed on a sheet of paper by offset printing to form an infrared ray-emitting layer having a thickness of 1 μm.

EXAMPLE 18

In the same manner as in the production of the ink composition in Example 8 except that the infrared ray-emitting fluorescent substance prepared in Example 16 ($Nd_{1.8}Yb_{0.2}Ca_5(MoO_4)_8$) was used, an ink composition was prepared and printed on a sheet of paper by an ink jet printer.

Comparative Example 1

In the same manner as in the production of the ink composition in Example 1 except that dodecylamine was not used, an ink composition was prepared and printed on a sheet of paper by screen printing to form an infrared ray-emitting layer having a thickness of 5 μm.

Comparative Example 2

In the same manner as in the production of the ink composition in Example 1 except that dodecylamine and diphenyl-2-methacryloyloxyethyl phosphate were not used, an ink composition was prepared and printed on a sheet of paper by offset printing to form an infrared ray-emitting layer having a thickness of 5 μm.

Comparative Example 3

In the same manner as in the production of the ink composition in Example 3 except that dodecylamine was not used, an ink composition was prepared and printed on a sheet of paper by screen printing to form an infrared ray-emitting layer having a thickness of 5 μm.

Comparative Example 4

In the same manner as in the production of the ink composition in Example 4 except that dodecylamine was not used, an ink composition was prepared and printed on a sheet of paper by screen printing to form an infrared ray-emitting layer having a thickness of 5 μm.

Comparative Example 5

In the same manner as in the production of the ink composition in Example 5 except that dodecylamine and diphenyl-2-methacryloyloxyethyl phosphate were not used, an ink composition was prepared and printed on a sheet of paper by offset printing to form an infrared ray-emitting layer having a thickness of 1 μm.

Comparative Example 6

In the same manner as in the production of the ink composition in Example 6 except that dodecylamine and diphenyl-2-methacryloyloxyethyl phosphate were not used, an ink composition was prepared and printed on a sheet of paper by offset printing to form an infrared ray-emitting layer having a thickness of 1 μm.

Comparative Example 7

In the same manner as in the production of the ink composition in Example 7 except that dodecylamine was not used, an ink composition was prepared and printed on a sheet of paper by screen printing to form an infrared ray-emitting layer having a thickness of 5 μm.

Comparative Example 8

In the same manner as in the production of the ink composition in Example 8 except that dodecylamine was not used, an ink composition was prepared and printed on a sheet of paper by the ink jet printer to form an infrared ray-emitting layer having a thickness of 5 μm.

Comparative Example 9

In the same manner as in the production of the ink composition in Example 10 except that dodecylamine was not used, an ink composition was prepared and printed on a sheet of paper by screen printing to form an infrared ray-emitting layer having a thickness of 5 μm.

Comparative Example 10

In the same manner as in the production of the ink composition in Example 16 except that dodecylamine was not used, an ink composition was prepared and printed on a sheet of paper by screen printing to form an infrared ray-emitting layer having a thickness of 5 μm.

Comparative Example 11

In the same manner as in the production of the ink composition in Example 17 except that dodecylamine and diphenyl-2-methacryloyloxyethyl phosphate were not used, an ink composition was prepared and printed on a sheet of paper by offset printing to form an infrared ray-emitting layer having a thickness of 1 μm.

Comparative Example 12

In the same manner as in the production of the ink composition in Example 18 except that dodecylamine was not used, an ink composition was prepared and printed on a sheet of paper by the ink jet printer to form an infrared ray-emitting layer having a thickness of 1 μm.

Comparative Example 13

In the same manner as in the production of the ink composition in Example 1 except that sodium dodecylbenzenesulfonate was used in place of dodecylamine, an ink composition was prepared and printed on a sheet of paper by screen printing to form an infrared ray-emitting layer having a thickness of 5 μm.

With an infrared ray-emitting layer which was printed on a sheet of paper from each of the ink compositions produced in Examples and Comparative Examples, an intensity of emitted light was measured.

The printed ink layer was excited by a light having a wavelength of 810 nm when the infrared ray-emitting fluorescent substance comprising Nb and Yb was used, and the emitted light was detected by a silicon photodetector having a peak sensitivity at 980 nm. To prevent the influence by the reflected light of the excited light, an optical filter (Imp) was placed in front of the photodetector.

The printed ink layer was excited by a light having a wavelength of 950 nm when the infrared ray-emitting fluorescent substance comprising Yb was used, and the emitted light was detected by a silicon photodetector having a peak sensitivity at 980 nm after 200 μsec. from the extinction of light.

When the infrared ray-emitting fluorescent substance comprising Nd was used, the intensity of emitted light was expressed as a relative value to that of the ink layer of Example 1 or 16 which was "100". When the infrared ray-emitting fluorescent substance comprising Yb and Y was used, the intensity of emitted light was expressed as a relative value to that of the ink layer of Example 3 which was "100". When the ink jet printer was used for printing, the intensity of emitted light was expressed as a relative value to that of the ink layer of Example 8 which was "100".

The results are shown in the following Table.

TABLE

| Example No. | Intensity of emitted light | Example No. | Intensity of emitted light |
| --- | --- | --- | --- |
| 1 | 100 | C. 1 | 86 |
| 11 | 101 | | |
| 12 | 98 | | |
| 2 | 8.5 | C. 2 | 4.3 |
| 4 | 105 | C. 4 | 84 |
| 6 | 8.7 | C. 6 | 4.5 |
| 7 | 22 | C. 7 | 16 |
| 10 | 42 | C. 9 | 31 |
| 13 | 8.3 | | |
| 14 | 7.5 | | |
| 15 | 7.9 | | |
| | | C. 13 | 30 |
| 3 | 100 | C. 3 | 84 |
| 5 | 8.7 | C. 5 | 4.6 |
| 8 | 100 | C. 8 | 71 |
| 9 | 105 | | |
| 16 | 100 | C. 10 | 40 |
| 17 | 9.0 | C. 11 | 1.3 |
| 18 | 102 | C. 12 | 80 |

As seen from the results in the Table, the infrared ray-emitting layers from the ink compositions of Examples 1–18 had higher intensities of emitted light than those from the ink compositions of Comparative Examples 1–13. That is, the ink composition of the present invention has good dispersibility of the infrared ray-emitting fluorescent substance and the high intensity of emitted light, and is excellent in light emitting characteristics.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ink composition comprising an infrared ray-emitting fluorescent substance, at least one dispersant selected from the group consisting of alkylamines and phosphate salts, and a binder resin.

2. The ink composition according to claim 1, wherein said dispersant is an alkylamine having 12 to 18 carbon atoms.

3. The ink composition according to claim 1, wherein said dispersant is a methacryloyl phosphate.

4. The ink composition according to claim 1, wherein said infrared ray-emitting fluorescent substance is a substance of the formula:

$$A_{1-x-y}Nd_xYb_yPO_4$$

wherein A is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 and not larger than 1.

5. The ink composition according to claim 1, wherein said infrared ray-emitting fluorescent substance is a substance of the formula:

$$A_{2-p-q}Nd_pYb_qCa_5(MoO_4)_8$$

wherein A is at least one element selected from the group consisting of Al, Bi, B, In, Ga, Sc, Gd, Ce, Y, Lu and La, p is a number of 0 to 2, and q is a number of 0 to 2, provided that a sum of p and q is larger than 0 and not larger than 2, whereby the ink layer is excellent in the light emitting characteristics.

6. The ink composition according to claim 1, wherein said binder resin is a UV curable resin.

7. The ink composition according to claim 1, wherein said binder resin is a water-soluble resin.

8. The ink composition according to claim 1, which is used in an ink jet printer and in which a particle size of said infrared ray-emitting fluorescent substance is from 0.1 to 2 μm.

9. The ink composition according to claim 8, which further comprises an electrical conducting aid.

10. A printed material comprising a base material and an infrared ray-emitting layer printed on said base material from an ink composition comprising an infrared ray-emitting fluorescent substance, at least one dispersant selected from the group consisting of alkylamines and phosphate salts, and a binder resin.

11. The printed material according to claim 10, wherein said infrared ray-emitting fluorescent substance is a substance of the formula:

$$A_{1-x-y}Nd_xYb_yPO_4$$

wherein A is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 and not larger than 1.

12. The printed material according to claim 10, wherein said infrared ray-emitting fluorescent substance is a substance of the formula:

$$A_{2-p-q}Nd_pYb_qCa_5(MoO_4)_8$$

wherein A is at least one element selected from the group consisting of Al, Bi, B, In, Ga, Sc, Gd, Ce, Y, Lu and La, p is a number of 0 to 2, and q is a number of 0 to 2, provided that a sum of p and q is larger than 0 and not larger than 2, whereby the ink layer is excellent in the light emitting characteristics.

13. The printed material according to claim 10, wherein said binder resin is a UV curable resin.

14. The printed material according to claim 10, wherein said binder resin is a water-soluble resin.

15. The printed material according to claim 10, wherein a particle size of said infrared ray-emitting fluorescent substance is from 0.1 to 2 μm.

16. The printed material according to claim 15, wherein said ink composition further comprises an electrical conductivity adjusting agent.

17. A method for preparing an infrared ray-emitting fluorescent substance of the formula:

$$A_{1-x-y}Nd_xYb_yPO_4$$

wherein A is at least one element selected from the group consisting of Al, Bi, B, In, Ga, Sc, Gd, Ce, Y, Lu and La, x is a number of 0 to 0.9, and y is a number of 0 to 0.9, provided that a sum of x and y is larger than 0 and not larger than 1 comprising mixing orthophosphoric acid or a phosphate salt of the formula:

$$M_{3-z}H_zPO_4$$

wherein M is at least one metal element selected from the group consisting of alkali metals and alkaline earth metals and z is a number of 0 to less than 3 with a raw material powder containing a compound of at least one element selected from the group consisting of Nd and Yb, sintering the mixture, air cooling the mixture, and hydrothermally treating it at a temperature of 50° C. or higher.

18. The method according to claim 17, wherein said raw material powder further contains a compound of at least one element selected from the group consisting of Al, Bi, B, In, Ga, Sc, Gd, Ce, Y, Lu and La.

19. A method for preparing an infrared ray-emitting fluorescent substance of the formula:

$$A_{2-p-q}Nd_pYb_qCa_5(MoO_4)_8$$

wherein A is at least one element selected from the group consisting of Al, Bi, B, In, Ga, Sc, Gd, Ce, Y, Lu and La, p is a number of 0 to 2, and q is a number of 0 to 2, provided that a sum of p and q is larger than 0 and not larger than 2 comprising mixing molybdenum oxide and calcium carbonate with a raw material powder containing a compound of at least one element selected from the group consisting of Nd and Yb, sintering the mixture, air cooling the mixture, and hydrothermally treating it at a temperature of 50° C. or higher.

20. The method according to claim 19, wherein said raw material powder further contains a compound of at least one element selected from the group consisting of Al, Bi, B, In, Ga, Sc, Gd, Ce, Y, Lu and La.

* * * * *